(12) United States Patent
Ulyanov (10) Patent No.: US 6,411,944 B1
(45) Date of Patent: Jun. 25, 2002

(54) SELF-ORGANIZING CONTROL SYSTEM

(75) Inventor: Sergei V. Ulyanov, Crema (IT)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/040,096

(22) Filed: Mar. 17, 1998

(30) Foreign Application Priority Data

Mar. 21, 1997 (JP) .............................. 9-087426

(51) Int. Cl.$^7$ ........................... G06F 15/18; G05B 11/01
(52) U.S. Cl. ............................... 706/13; 706/2; 700/13
(58) Field of Search ......................... 706/13, 2; 700/42

(56) References Cited

U.S. PATENT DOCUMENTS

| | | | | |
|---|---|---|---|---|
| 5,295,061 A | * | 3/1994 | Kayatama et al. | 700/37 |
| 5,613,369 A | * | 3/1997 | Sato et al. | 62/89 |
| 5,727,127 A | * | 3/1998 | Horn et al. | 706/52 |
| 5,971,579 A | * | 10/1999 | Kim | 700/42 |

OTHER PUBLICATIONS

"Design of Lyapunov Function Based Fuzzy Logic Controller"; Chin–Yin Tsai and Tzu–Hseng S. Li; Intelligent control System Laboratory; Department of Electrical Engineering; National Cheng Kung University, Taiwan, Republic of China Jun. 1996.*

Bose Bimal K., (1994), "Expert System, Fuzzy Logic, and Neural Network Applications in Power Electric and Motion Control", Processing of the IEEE, vol. 82, No. 8, pp. 1303–1323.

Feng Q. and Yamafuji K., (1998), "Design and simulation of control system of an inverted pendulum", Robotica, vol. 6, No. 3, pp. 235–241.

Gradetsky V.G. and Ulyanov S.V., (1993), "Mobile system with wall climbing robots", Intern. J. of Computer and Systems Sciences, vol. 31, No. 1, pp. 126–142.

Johansson R., Magnusson M. and Fransson P.A., (1995), "Galvanic vestibular stimulation for analysis of postural adaptation and stability", IEEE Transactions on Biomedical Engineering, vol. 42, No. 3, pp. 282–292.

Ju M.–S., Yi S.–G, Tsuei Y.–G, and Chou Y.–L., (1995), "Fuzzy control of electrohydraulic above–knee prostheses", JSME International Journal, vol. 38, No. 1, pp. 78–85.

Lee Y.N., Kim T.W. and Suh I.H., (1994), "A look–up table–based self–organizing fuzzy plus linear controller", Mechatronics, vol. 4, No. 1, pp. 71–90.

Liu T.S. and Wu J.C., (1993), "A model for rider–motorcycle system using fuzzy control", IEEE Transactions on Systems, Man and Cybernetics, vol. 23–SMC, No. 1, pp. 267–276.

Mendel, Jerry M., (1995), "Fuzzy Logic Systems for Engineering: A Tutorial", Proceeding of the IEEE, vol. 83, No. 3, pp. 345–377.

Nakajima R., Tsubouchi T., Yuta S. and Koyanagi E., (1997), "A development of a new mechanism of an sutonomous unicycle", Proc. IEEE/RSJ International Conference on Intelligent Robots and System (IROS '97), vol. 2, Grenoble, France, pp. 906–912.

Perround M. and Saucier A., (1987), "Thermodynamics of dissipative systems", Helvetica Physica, vol. 60, No. 8, pp. 1038–1051.

(List continued on next page.)

Primary Examiner—George B. Davis
(74) Attorney, Agent, or Firm—Knobbe, Martens, Olson & Bear LLP (57) ABSTRACT

A self-organizing control system suitable for nonlinear control of a physical object is described. The control system calculates the entropy production difference between a time differentiation ($dS_u/dt$) of the entropy inside the controlled object and a time differentiation ($dS_c/dt$) of the entropy given to the controlled object from a PID controller that controls the object. The entropy production difference is used to generate an evolving control rule by using the entropy production difference as a performance function for a genetic optimizer.

16 Claims, 10 Drawing Sheets

OTHER PUBLICATIONS

Sheng Z.Q. and Yamafuji K., (1995), "Realization of a human riding a unicycle by a robot", Proc. of '95 IEEE Intern. Conf. on Robotics & Automation, Japan, vol. 2, pp. 1319–1326.

Sheng Z.Q. and Yamafuji K., (1997), "Postural stability of a human riding a unicyle and its emulation by a robot", IEEE Trans. on Robotics and Automation, vol. 13, No. 5, pp. 709–720.

Sheng, Z.Q. and Yamafuji K., (1995), "Study on the stability and motion control of a unicycle, $1^{st}$ Report: Dynamics of a human riding a unicycle and its modeling by link mechanism", JSME International Journal, vol. 38C, No. 2, pp. 249–259.

Sheng Z.Q., Yamafuji K. and Ulyanov S.V., (1996), "Study on the stability and motion control of a unicycle. Pts 3," JSME International Journal, vol. 39, No. 3, pp. 560–568.

Ulyanov S.V., (1992), "Fuzzy models of Intelligent control systems: Theoretical and applied aspects" Soviet Journal of Computer and Systems Sciences (Engineering Cybernetics), vol. 30, No. 4, pp. 1–22.

Ulyanov S.V., Sheng Z.Q., Yamafuji K., Watanabe S. and Ohkura T., (1995), "Self–organization fuzzy chaos Intelligent Controller for a robotic unicycle: A New benchmark in AI control", Proc. of $5^{th}$ Intelligent System Synposium: Fuzzy, AI and Neural Network Applications Technologies (FAN Symp. '95), Tokyo, pp. 41–46.

Ulyanov S.V. and Yamafuji K., (1996), "Fuzzy Intelligent emotion and instinct control of a robotic unicycle", $4^{th}$ Intern. Workshop on Advanced Motion Control, Mie, Japan, vol. 1, pp. 127–132.

Ulyanov S.V., Feng Q., Yamafuji K. and Ulyanov V.S., (1998), "Stochastic analysis of nonlinear dynamic system with time–dependent structure, Pts. 1, 2", Probabilistic Engineering Mechanics (published).

Ulyanov, S.V., Yamafuji, K., Gradetsky V.G., and Pagni, A., "Expert Fuzzy–Neuro Controller Desing for Wall Climbing Robot for Decontamination of Nuclear–Power Station", Journal of Robotics and Mechatronics, vol. 7, No. 1, 1995, pp. 75–86.

Ulyanov, S.V., Yamafuji, K., Ulyanov, V.S., Kurawaki, I., Hagiwara, T. and Panfilov, S.A., "Computaional Intelligence for Robust Control Algorithms of Complex Dynamic Systems with Minimum Entropy Production Part 1: Simulation of Entropy–Like Dynamic Behavior and Lyapunov Stability", Journal of Advanced Computational Intelligence, vol. 3, No. 2, 1999, pp. 82–89.

Ulyanov, V.S., Yamafuji, K., Ulyanov, S.V., and Tanaka K., "Computational Intelligence with New Physical Controllability Measure sure Robust Control Algorithm of Extension-Cableless Robotic Unicycle", Journal of Advanced Computational Intelligence, vol. 3, No. 2, 1999, pp. 136–147.

V.S. Ulyanov, Watanabe, S. Yamafuji, K., Ulyanov, S.V., Litvintseva, L.V., and Kurawaki, I. "Intelligent robust control of a robotic unicycle based on a new physical measure for mechanical controllability" Advanced Robotics, vol. 12, No. 4 1998, pp. 455–481.

Ulyanov, S.V., Yamafuji, K., Miyagawa, K., Tanaka, T. and Fukuda T., "Intelligent Fuzzy Motion control of Mobile Robot for Service Use", IEEE/RSJ International Conference on Intelligent Robots and Systems, Human Robot Interaction and Cooperative Robots, vol. 3, Aug. 5–9, 1995, pp. 486–491.

Ulyanov, S.V., Yamafuji, K., Arai, F., and Fukuda T., "Modelling of Micro–Nano–Robots and Physical Limit of Micro Control" Journal of the Robotics Society of Japan, vol. 14, No. 8, Nov. 1996, pp. 18–21.

van Rooij A.J.F., Jain L.C. and Johnson R.P., (1997), "Neural Network Training Using Genetic Algorithms" (Machine Perception and Artificial Intelligence, vol. 26). World Scientific Pub., SGP.

Vasilieva O.I., Ionov I.P. and Ulyanov S.V., (1989), "Dual control of the artificial ventilation process with use of a fuzzy controller in the feedback circuit", Biomedical Eng., vol. 23, No. 1, pp. 7–16.

Wu J.G. and Llu T.S., (1995), "Fuzzy control of rider–motorcycle system using genetic algorithm and auto–tuning", Mechatronics, vol. 4, No. 4, pp. 441–455.

Wu J.C. and Llu T.S., (1996), "Fuzzy control stabilization with applications to motorcycle control", IEEE Transactions on Systems, Man and Cybernetics, vol. 26, No. 6, pp. 836–847.

Zhakharov V.N. and Ulyanov S.V., (1994), "Fuzzy models of intelligent industrial controllers and control systems, Pts 1", Journal of Computer and Systems Sciences International, vol. 32, No. 1, pp. 123–144.

Zhakharov V.N. and Ulyanov S.V., (1995), "Fuzzy models of intelligent industrial controllers and control systems Pts 2,3", Journal of Computer and Systems Sciences International, vol. 33, No. 2, pp. 94–108; 117–136.

* cited by examiner

SELF-ORGANIZING CONTROL SYSTEM

BACKGROUND OF THE INVENTION

1. Field of the Invention

The disclosed invention relates to generally control systems, and more particularly to control systems using artificial intelligence to control a nonlinear plant.

2. Description of the Related Art

Feedback control systems are widely used to maintain the output of a dynamic system at a desired value in spite of external disturbance forces that would move the output away from the desired value. For example, a household furnace controlled by a thermostat is an example of a feedback control system. The thermostat continuously measures the air temperature of the house, and when the temperature falls below a desired minimum temperature, the thermostat turns the furnace on. When the furnace has warmed the air above the desired minimum temperature, then the thermostat turns the furnace off. The thermostat-furnace system maintains the household temperature at a constant value in spite of external disturbances such as a drop in the outside air temperature. Similar types of feedback control are used in many applications.

A central component in a feedback control system is a controlled object, otherwise known as a process "plant," whose output variable is to be controlled. In the above example, the plant is the house, the output variable is the air temperature of the house, and the disturbance is the flow of heat through the walls of the house. The plant is controlled by a control system. In the above example, the control system is the thermostat in combination with the furnace. The thermostat-furnace system uses simple on-off feedback control to maintain the temperature of the house. In many control environments, such as motor shaft position or motor speed control systems, simple on-off feedback control is insufficient. More advanced control systems rely on combinations of proportional feedback control, integral feedback control, and derivative feedback control. Feedback that is the sum of proportional plus integral plus derivative feedback is often referred to as PID control.

The PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly nonlinear, and unstable. For example, the dynamic model may contain parameters (e.g., masses, inductances, aerodynamic coefficients, etc.) which are either poorly known or depend on a changing environment. If the parameter variation is small and the dynamic model is stable, then the PID controller may be sufficient. However, if the parameter variation is large, or if the dynamic model is unstable, then it is common to add adaptation or intelligent (AI) control to the PID control system.

AI control systems use an optimizer, typically a nonlinear optimizer, to program the operation of the PID controller and thereby improve the overall operation of the control system. The optimizers used in many AI control systems rely on a genetic algorithm. Using a set of inputs, and a fitness function, the genetic algorithm works in a manner similar to process of evolution to arrive at a solution which is, hopefully, optimal. The genetic algorithm generates sets of chromosomes (corresponding to possible solutions) and then sorts the chromosomes by evaluating each solution using the fitness function. The fitness function determines where each solution ranks on a fitness scale. Chromosomes which are more fit, are those chromosomes which correspond to solutions that rate high on the fitness scale. Chromosomes which are less fit, are those chromosomes which correspond to solutions that rate low on the fitness scale. Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The PID controller has a linear transfer function and thus is based upon a linearized equation of motion for the plant. Prior art genetic algorithms used to program PID controllers typically use simple fitness functions and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with nonlinear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This technique works poorly, if at all, for plants described by models that are unstable or dissipative.

SUMMARY OF THE INVENTION

The present invention solves these and other problems by providing a new AI control system. Unlike prior AI control systems, the new AI control system is self-organizing and uses a new fitness (performance) function $f$ that is based on the physical law of minimum entropy. The self-organizing control system may be used to control complex plants described by nonlinear, unstable, dissipative models. The self-organizing control system further provides a physical measure of control quality based on physical law of minimum production entropy in an intelligent control system and in complex dynamic behavior control of a plant.

In one embodiment, the invention includes a method for controlling a nonlinear object (a plant) by obtaining an entropy production difference between a time differentiation ($dS_u/dt$) of the entropy of the plant and a time differentiation ($dS_c/dt$) of the entropy provided to the plant from a controller. A genetic algorithm that uses the entropy production difference as a fitness (performance) function evolves a control rule for a low-level controller, such as a PID controller. The nonlinear stability characteristics of the plant are evaluated using a Lyapunov function. The evolved control rule may be corrected using further evolutions.

In some embodiments, the control method may also include evolving a control rule relative to a variable of the controller by means of a genetic algorithm. The genetic algorithm uses a fitness function based on a difference between a time differentiation of the entropy of the plant ($dS_u/dt$) and a time differentiation ($dS_c/dt$) of the entropy provided to the plant. The variable may be corrected by using the evolved control rule.

In another embodiment, the invention comprises an AI control system adapted to control a nonlinear plant. The AI control system includes a simulator configured to use a thermodynamic model of a nonlinear equation of motion for the plant. The thermodynamic model is based on a Lyapunov function (V), and the simulator uses the function V to analyze control for a state stability of the plant. The AI control system calculates an entropy production difference between a time differentiation of the entropy of said plant ($dS_u/dt$) and a time differentiation ($dS_c/dt$) of the entropy provided to the plant by a low-level controller that controls the plant. The entropy production difference is used by a genetic algorithm to obtain an adaptation function in which the entropy production difference is minimized. The genetic algorithm provides a teaching signal to a fuzzy logic classifier that determines a fuzzy rule by using a learning process. The fuzzy logic controller is also configured to form a control rule that sets a control variable of the low-level controller.

In one embodiment, the low-level controller is a linear controller such as a PID controller. The learning processes may be implemented by a fuzzy neural network configured to form a look-up table for the fuzzy rule.

In yet another embodiment, the invention comprises a new physical measure of control quality based on minimum production entropy and using this measure for a fitness function of genetic algorithm in optimal control system design. This method provides a local entropy feedback loop in the control system. The entropy feedback loop provides for optimal control structure design by relating stability of the plant (using a Lyapunov function) and controllability of the plant (based on production entropy of the control system). The control system is applicable to all control systems, including, for example, control systems for mechanical systems, biomechanical systems, robotics, electro-mechanical systems, etc.

BRIEF DESCRIPTION OF THE DRAWINGS

The advantages and features of the disclosed invention will readily be appreciated by persons skilled in the art from the following detailed description when read in conjunction with the drawings listed below.

DETAILED DESCRIPTION OF THE PREFERRED EMBODIMENT

A feedback control system is commonly used to control an output variable of a process or plant in the face of some disturbance. Linear feedback control systems typically use combinations of proportional feedback control, integral feedback control, and derivative feedback control. Feedback that is the sum of proportional plus integral plus derivative feedback is often referred to as PID control. The Laplace transform of an output u(s) of a PID controller is given by:

$$u(s) = G(s)e(s) = \left[k_1 + \frac{k_2}{s} + k_3 s\right]e(s) \quad (1)$$

In the above equation, G(s) is the transfer function of the PID controller, e(s) is the controller input, u(s) is the controller output, $k_1$ is the coefficient for proportional feedback, $k_2$ is the coefficient for integral feedback, and $k_3$ is the coefficient for derivative feedback. The coefficients $k_i$ may be represented by a coefficient vector K, where K=[$k_1$, $k_2$, $k_3$]. The vector K is commonly called a Coefficient Gain Schedule (CGS). The values of the coefficients K used in the linear PID control system are based on a dynamic model of the plant. When the plant is unstable, nonlinear, and/or time-variant, then the coefficients in K are often controlled by an AI control system.

Figure 1:
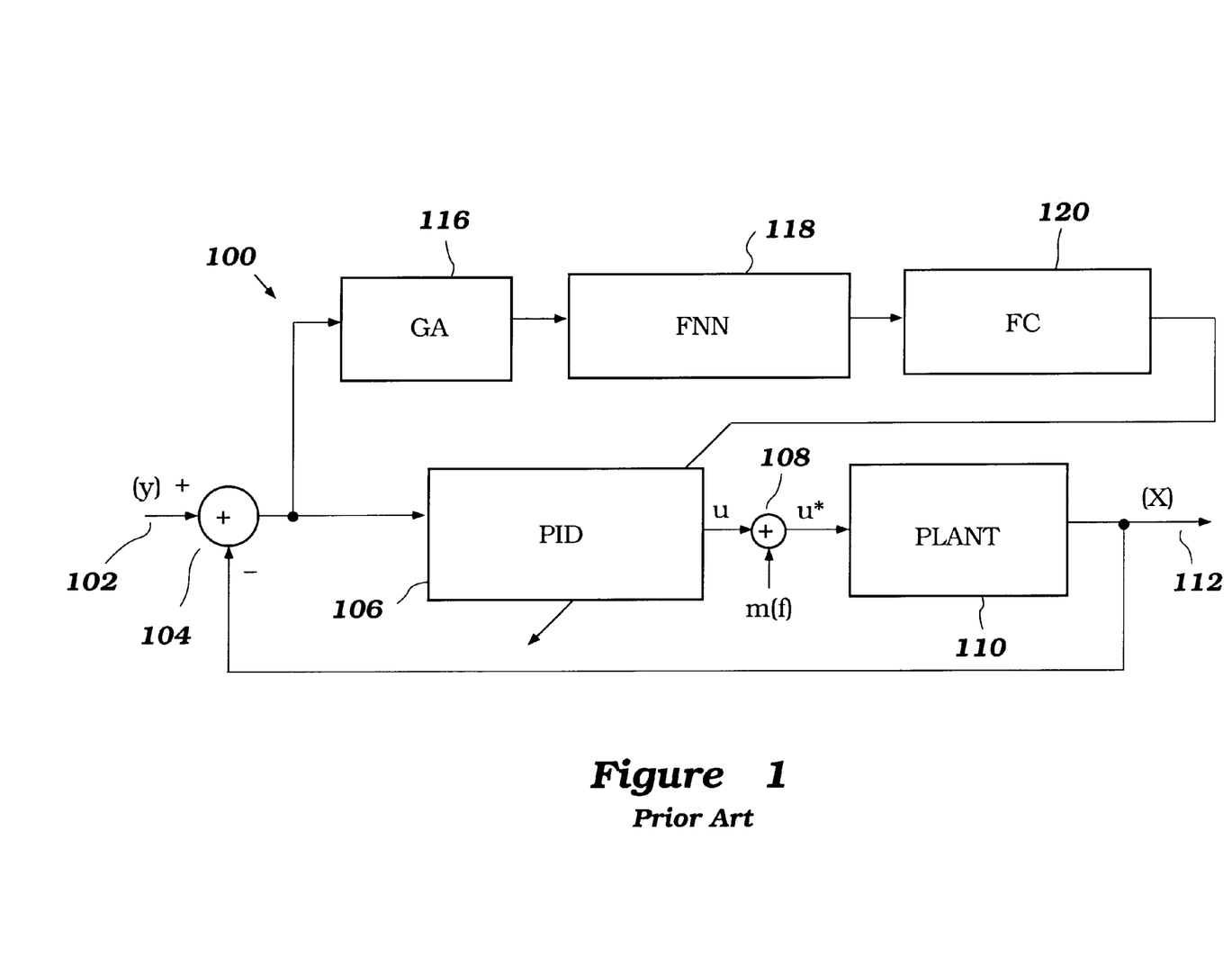
FIG. 1 is a block diagram showing an example of an AI control method in the prior art.

FIG. 1 shows a typical prior art AI control system 100. An input y(t) of the control system 100 is provided to a plus input of an adder 104 and an output x(t) of a plant 110 is provided to a minus input of the adder 104. An output of the adder 104 is provided as an error signal e(t) to an error signal input of a PID controller 106. An output u(t) of the PID controller 106 is provided to a first input of an adder 108 and to a first input of a Genetic Algorithm (GA). A disturbance m(t) is provided to a second input of the adder 108. An output u*(t) of the adder 108 is provided to an input of the plant 110. The plant 110 has a transfer function H(s) and an output x(t), where x(t)⇆X(s) (where the symbol⇆denotes the Laplace transform) and X(s)=G(s)u*(s). An output of the genetic algorithm 116 is provided to an input of a Fuzzy logic Neural Network (FNN) 118 and an output of the fuzzy neural network 118 is provided to a Fuzzy Controller (FC) 120. An output of the fuzzy controller 120 is a set of coefficients K, which are provided to a coefficient input of the PID controller 106.

Figure 2:
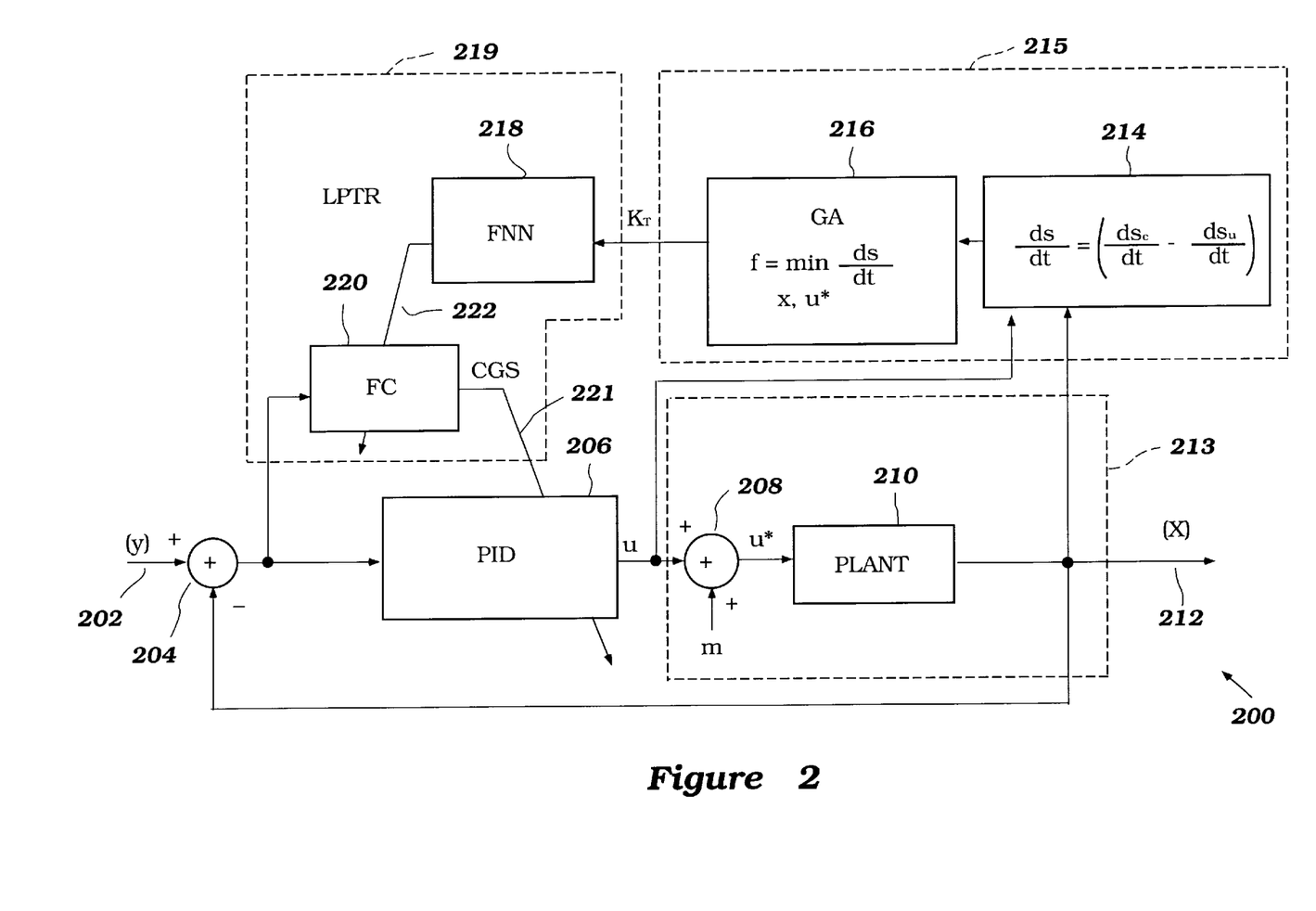
FIG. 2 is a block diagram showing an embodiment of an AI control method in accordance with one aspect of the present invention.

The combination of the genetic algorithm 216 and the entropy calculator 214 comprises a Simulation System of Control Quality 215. The combination of the fuzzy neural network 218 and the fuzzy controller 220 comprises a Fuzzy Logic Classifier System FLCS 219. The combination of the plant 210 and the adder 208 comprises a disturbed plant model 213. The disturbed plant signal u*(t)=u(t)+m(t), and the disturbance m(t) are typically unobservable.

The error signal e(t) provided to the PID controller 106 is the difference between the desired plant output value y(t) and the actual plant output value x(t). The PID controller 106 is designed to minimize the error represented by e(t) (the error being the difference between the desired and actual output signal signals). The PID controller 106 minimizes the error e(t) by generating an output signal u(t) which will move the output signal x(t) from the plant 110 closer to the desired value. The genetic algorithm 116, fuzzy neural network 118, and fuzzy controller 120 monitor the error signal e(t) and modify the gain schedule K of the PID controller 106 in order to improve the operation of the PID controller 106.

The PID controller 106 constitutes a reverse model relative to the plant 110. The genetic algorithm 116 evolves an output signal α based on a performance function $f$. Plural candidates for α are produced and these candidates are paired according to which plural chromosomes (parents) are produced. The chromosomes are evaluated and sorted from best to worst by using the performance function $f$. After the evaluation for all parent chromosomes, good offspring chromosomes are selected from among the plural parent chromosomes, and some offspring chromosomes are randomly selected. The selected chromosomes are crossed so as to produce the parent chromosomes for the next generation. Mutation may also be provided. The second-generation parent chromosomes are also evaluated (sorted) and go through the same evolutionary process to produce the next-generation (i.e., third-generation) chromosomes. This evolutionary process is continued until it reaches a predetermined generation or the evaluation function $f$ finds a chromosome with a certain value. The outputs of the genetic algorithm are the chromosomes of the last generation. These chromosomes become input information a provided to the fuzzy neural network 118.

In the fuzzy neural network 118, a fuzzy rule to be used in the fuzzy controller 120 is selected from a set of rules. The selected rule is determined based on the input information α from the genetic algorithm 116. Using the selected rule, the fuzzy controller 120 generates a gain schedule K for the PID controller 106. The vector coefficient gain schedule K is provided to the PID controller 106 and thus adjusts the operation of the PID controller 106 so that the PID controller 106 is better able to minimize the error signal e(t).

Although the AI controller 100 is advantageous for accurate control in regions near linearized equilibrium points, the accuracy deteriorates in regions away from the linearized equilibrium points. Moreover, the AI controller 100 is typically slow or even unable to catch up with changes in the environment surrounding the plant 110. The PID controller 106 has a linear transfer function G(s) and thus is based upon a linearized equation of motion for the plant 110. Since the evaluation function $f$ used in the genetic algorithm 116 is only based on the information related to the input e(t) of the linear PID controller 106, the controller 100 does not solve the problem of poor controllability typically seen in linearization models. Furthermore, the output results, both in the gain schedule K and the output x(t) often fluctuate greatly, depending on the nature of the performance function $f$ used in the genetic algorithm 116. The genetic algorithm 116 is a nonlinear optimizer that optimizes the performance function $f$. As is the case with most optimizers, the success or failure of the optimization often ultimately depends on the selection of the performance function $f$.

The present invention solves these and other problems by providing a new AI control system 200 shown in FIG. 2. Unlike prior AI control systems, the control system 200 is self-organizing and uses a new performance function $f$ which is based on the physical law of minimum entropy. An input y(t) of the control system 200 is provided to a plus input of an adder 204 and an output x(t) of a plant 210 is provided to a minus input of the adder 204. An output of the adder 204 is provided as an error signal e(t) to an error signal input of a PID controller 206 and to an input of a fuzzy controller 220. An output u(t) of the PID controller 206 is provided to a first input of an adder 208 and to a first input of an entropy calculator (EC) 214. A disturbance m(t) is provided to a second input of the adder 208. An output u*(t) of the adder 208 is provided to an input of the plant 210. The plant 210 has a transfer function H(s) and an output x(t), such that X(s)=G(s)u*(s), where x(t)⇔X(s). The output x(t) is provided to a second input of the entropy calculator 214 and to the minus input of the adder 204. An output of the entropy calculator 214 is provided to an input of a genetic algorithm 216 and an output of the genetic algorithm 216 is provided to an input of a Fuzzy logic Neural Network (FNN) 218. An output of the fuzzy neural network 218 is provided to a rules selector input 222 of the fuzzy controller 220. A Coefficient Gain Schedule (CGS) output 212 of the fuzzy controller 222 is provided to a gain schedule input of the PID 206.

The error signal e(t) provided to the PID controller 206 is the difference between the desired plant output value y(t) and the actual plant output value x(t). The PID controller 206 is designed to minimize the error represented by e(t). The PID controller 206 minimizes the error e(t) by generating an output signal u(t) which will move the output signal x(t) from the plant 210 closer to the desired value. The fuzzy controller 220 monitors the error signal e(t) and modifies the gain schedule K of the PID controller 206 according to a fuzzy control rule selected by the fuzzy neural network 218.

The genetic algorithm 216 provides a teaching signal $K_T$ to the fuzzy neural network 218. The teaching signal $K_T$ is a global optimum solution of a coefficient gain schedule K generated by the genetic algorithm 216.

The PID controller 206 constitutes a reverse model relative to the plant 210. The genetic algorithm 216 evolves an output signal a based on a performance function $f$. Plural candidates for α are produced and these candidates are paired by which plural chromosomes (parents) are produced. The chromosomes are evaluated and sorted from best to worst by using the performance function $f$. After the evaluation for all parent chromosomes, good offspring chromosomes are selected from among the plural parent chromosomes, and some offspring chromosomes are randomly selected. The selected chromosomes are crossed so as to produce the parent chromosomes for the next generation. Mutation is also employed. The second-generation parent chromosomes are also evaluated (sorted) and go through the same evolutionary process to produce the next-generation (i.e., third-generation) chromosomes. This evolutionary process is continued until it reaches a predetermined generation or the evaluation function $f$ finds a chromosome with a certain value. Then, a component from a chromosome of the last generation becomes a last output, i.e., input information α provided to the fuzzy neural network 218.

In the fuzzy neural network 218, a fuzzy rule to be used in the fuzzy controller 220 is selected from a set of rules. The selected rule is determined based on the input information α from the genetic algorithm 216. Using the selected rule, the fury controller 220 generates a gain schedule K for the PID controller 206. This is provided to the PID controller 206 and thus adjusts the operation of the PID controller 206 so that the PID controller 206 is better able to minimize the error signal e(t).

The fitness function $f$ for the genetic algorithm is given by $$f = \min \frac{dS}{dt} \tag{2}$$

were $$\frac{dS}{dt} = \left(\frac{dS_c}{dt} - \frac{dS_u}{dt}\right) \tag{3}$$

The quantity $dS_u/dt$ represents the rate of entropy production in the output $x(t)$ of the plant 210. The quantity $dS_c/dt$ represents the rate of entropy production in the output $u(t)$ of the PID controller 206.

Dynamic stability properties of the plant 210 near an equilibrium point can be determined by use of Lyapunov functions. Let $V(x)$ be a continuously differentiable scalar function defined in a domain $D \subset R^n$ that contains the origin. The function $V(x)$ is said to be positive definite if $V(\mathbf{0})=0$ and $V(x)>0$ for $x \neq 0$. The function $V(x)$ is said to be positive semidefinite if $V(x) \geq 0$ for all $x$. A function $V(x)$ is said to be negative definite or negative semidefinite if $-V(x)$ is positive definite or positive semidefinite, respectively. The derivative of $V$ along the trajectories $\dot{x}=f(x)$ is given by:

$$\dot{V}(x) = \sum_{i=1}^{n} \frac{\partial V}{\partial x_i} \dot{x}_i = \frac{\partial V}{\partial x} f(x) \tag{4}$$

where $\partial V/\partial x$ is a row vector whose $i$th component is $\partial V/\partial x_i$ and the components of the n-dimensional vector $f(x)$ are locally Lipschitz functions of $x$, defined for all $x$ in the domain $D$. The Lyapunov stability theorem states that the origin is stable if there is a continuously differentiable positive definite function $V(x)$ so that $\dot{V}(x)$ is negative definite. A function $V(x)$ satisfying the conditions for stability is called a Lyapunov function.

Calculation of the Lyapunov dynamic stability and entropy production for a closed nonlinear mechanical system is demonstrated by using the Holmes-Rand (Duffing-Van der Pol) nonlinear oscillator as an example. The Holmes-Rand oscillator is described by the equation:

$$\ddot{x}+(\alpha+\beta x^2)\dot{x}-\gamma x+x^3=0 \tag{5}$$

where $\alpha$, $\beta$, and $\gamma$ are constant parameters. A Lyapunov function for the Holmes-Rand oscillator is given by:

$$V = \frac{1}{2}\dot{x}^2 + U(x), \text{ where } U = \frac{1}{4}x^4 - \frac{1}{2}\gamma x^2 \tag{6}$$

Entropy production $d_iS/dt$ for the Holmes-Rand oscillator is given by the equation:

$$\frac{d_iS}{dt} = (\alpha + \beta x^2)\dot{x}^2 \tag{7}$$

Equation 5 can be rewritten as:

$$\ddot{x} + (\alpha + \beta x^2)\dot{x} + \frac{\partial U}{\partial x} = 0 \tag{8}$$

After multiplying both sides of the above equation by $\dot{x}$, then $dV/dt$ can be calculated as:

$$\frac{dV}{dt} = \ddot{x}\dot{x} + \frac{\partial U}{\partial x}\dot{x} = -\frac{1}{T}\frac{d_iS}{dt} \tag{9}$$

where $T$ is a normalizing factor.

An interrelation between a Lyapunov function and the entropy production in an open dynamic system can be established by assuming a Lyapunov function of the form $$V = \frac{1}{2}\sum_{i=1}^{6}(q_i^2 + S^2) \tag{10}$$

where $S=S_u-S_c$ and $q_i=(\alpha, \gamma, \beta, \dot{\alpha},\dot{\gamma},\dot{\beta})$. It is possible to introduce the entropy function $S$ in the Lyapunov function $V$ because entropy $S$ is also a scalar function of time. Differentiation of $V$ with respect to time gives:

$$\frac{dV}{dt} = \sum_{i=1}^{6} q_i \dot{q}_i + S\dot{S} \tag{11}$$

In this case, $\dot{q}_i=\psi_i(q_i,\tau,t)$, $S=S_u-S_c$, $\dot{S}=\dot{S}_u-\dot{S}_c$ and thus:

$$\frac{dV}{dt} = \sum_{i=1}^{6} q_i \varphi_i(q_i, \tau, t) + (S_u - S_c)\left(\frac{dS_u}{dt} - \frac{dS_c}{dt}\right) \tag{12}$$

A special case occurs when $\beta=0$ and the Holmes-Rand oscillator reduces to a force-free Duffing oscillator, wherein:

$$\frac{d_iS}{dt} = -\alpha\dot{x}^2 \quad \text{(Duffing oscillator)} \tag{13}$$

A Van der Pol oscillator is described by the equation:

$$\ddot{x}+(x^2-1)\dot{x}+=0 \tag{14}$$

and the entropy production is given by:

$$\frac{d_iS}{dt} = \frac{1}{T}(x^2-1)\dot{x}^2 \quad \text{(Van der Pol oscillator)} \tag{15}$$

For a micro-mobile robot in fluid, a mechanical model is given by:

$$m_1\ddot{x}_1 + C_d\frac{\rho}{2}A_1|\dot{x}_1|\dot{x}_1 + K_1(x_1 - x_0 - l_1\theta_0) - K_2(x_2 - x_1 - l_2\theta_1) = 0 \tag{16}$$

$$m_2\ddot{x}_2 + C_d\frac{\rho}{2}A_2|\dot{x}_2|\dot{x}_2 + K_2(x_2 - x_1 - l_2\theta_1) - K_3(x_3 - x_2 - l_3\theta_2) = 0 \tag{17}$$

$$m_3\ddot{x}_3 + C_d\frac{\rho}{2}A_3|\dot{x}_3|\dot{x}_3 + K_3(x_3 - x_2 - l_3\theta_2) = 0 \tag{18}$$

where:

$$\theta_{n+1} = -\frac{1}{2}\theta_n + \frac{3}{2}\frac{1}{l_{n+1}}(x_{n+1} - x_n) \tag{19}$$

Values for a particular micro-mobile robot are given in Table 1 below.

TABLE 1

| Item | Value | Units |
|---|---|---|
| $m_1$ | $1.6 \times 10^{-7}$ | kg |
| $m_2$ | $1.4 \times 10^{-6}$ | kg |
| $m_3$ | $2.4 \times 10^{-6}$ | kg |
| $l_1$ | $2.0 \times 10^{-3}$ | m |
| $l_1$ | $4.0 \times 10^{-3}$ | m |
| $l_3$ | $4.0 \times 10^{-3}$ | m |
| $K_1$ | 61.1 | N/m |
| $K_2$ | 13.7 | N/m |
| $K_3$ | 23.5 | N/m |
| $A_1$ | $4.0 \times 10^{-6}$ | $m^2$ |
| $A_2$ | $2.4 \times 10^{-6}$ | $m^2$ |
| $A_3$ | $4.0 \times 10^{-6}$ | $m^2$ |
| $C_d$ | 1.12 | — |
| $\rho$ | 1000 | $Kg/m^3$ |

Entropy production for the micro-mobile robot is given by the equation:

$$\frac{dS_i}{dt} = \sum_{n=1}^{3} C_d \frac{\rho}{2} A_n |\dot{x}_n| \dot{x}_n^2 \tag{20}$$

and the Lyapunov Function is given by:

$$V = \sum_{i=1}^{3} m_i \dot{x}_i^2 \frac{\rho}{2} + \sum_{i=1}^{3} \frac{K_i (x_i - x_{i-1} - l_i \theta_{i-1})^2}{2} + \frac{S^2}{2} \tag{21}$$

where $S = S_i - S_c$ and $S_c$ is the entropy of a controller with torque $\tau$.

The necessary and sufficient conditions for Lyapunov stability of a plant is given by the relationship:

$$\sum_i \backslash(\backslash\%\backslash) q_i \varphi_i (q_i, \tau, t) < (S_u - S_c)\left(\frac{dS_c}{dt} - \frac{dS_i}{dt}\right), \frac{dS_c}{dt} > \frac{dS_i}{dt} u \tag{22}$$

According to the above equation, stability of a plant can be achieved with "negentropy" $S_c$ (by Brillouin's terminology) where a change of negentropy $dS_c/dt$ in the control system 206 is subtracted from a change of entropy $dSi/dt$ in the motion of the plant 210.

The robust AI control system 200 provides improved control of mechanical systems in stochastic environments (e.g., active vibration control), intelligent robotics and electro-mechanical systems (e.g., mobile robot navigation, manipulators, collective mobile robot control), bio-mechanical systems (e.g., power assist systems, control of artificial replaced organs in medical systems as artificial lung ventilation), micro electromechanical systems (e.g., micro robots in fluids), etc.

The genetic algorithm realizes the search of optimal controllers with a simple structure using the principle of minimum entropy production. The fuzzy neural network controller offers a more flexible structure of controllers with a smaller torque, and the learning process produces less entropy. The fuzzy neural network controller gives a more flexible structure to controllers with smaller torque and the learning process produces less entropy than a genetic analyzer alone. Thus, an instinct mechanism produces less entropy than an intuition mechanism. However, necessary time for achieving an optimal control with learning process on fuzzy neural network (instinct) is larger than with the global search on genetic algorithm (intuition).

Realization of coordinated action between the look-up tables of the fuzzy controller 220 is accomplished by the genetic algorithm and the fuzzy neural network. In particular, the structure 200 provides a multimode fuzzy controller coupled with a linear or nonlinear neural network 218. The control system 200 is a realization of a self-organizing AI control system with intuition and instinct. In the adaptive controller 200, the feedback gains of the PID controller 210 are changed according to the quantum fuzzy logic, and approximate reasoning is provided by the use of nonlinear dynamic motion equations.

The fuzzy tuning rules for the gains $k_i$ are shaped by the learning system in the fuzzy neural network 218 with acceleration of fuzzy rules on the basis of global inputs provided by the genetic algorithm 216. The control system 200 is thus a hierarchical, two-level control system that is intelligent "in small." The lower (execution) level is provided by a traditional PID controller 206, and the upper (coordination) level is provided by a KB (with fuzzy inference module in the form of production rules with different model of fuzzy implication) and fuzzification and de-fuzzification components, respectively.

Parallel soft computing for fuzzy control is preferably based on quantum computing. The genetic algorithm 216 simulates an intuition mechanism of choosing the optimal structure of the PID controller 206 by using the fitness function, which is the measure of the entropy production, and the evolution function, which in this case is entropy.

Unicycle Robot with Self-Organizing Control

Figure 3:
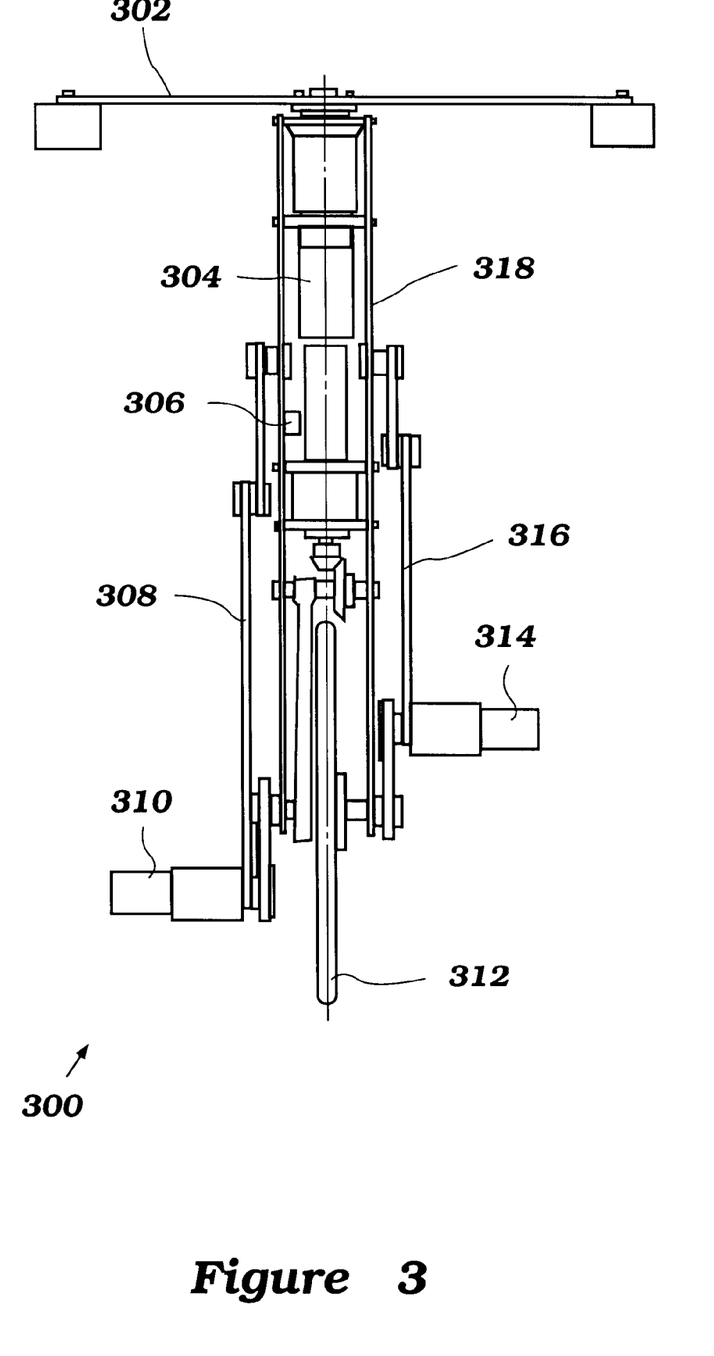
FIG. 3 is a front view showing a robot unicycle used in a simulation of the present invention.
Figure 4:
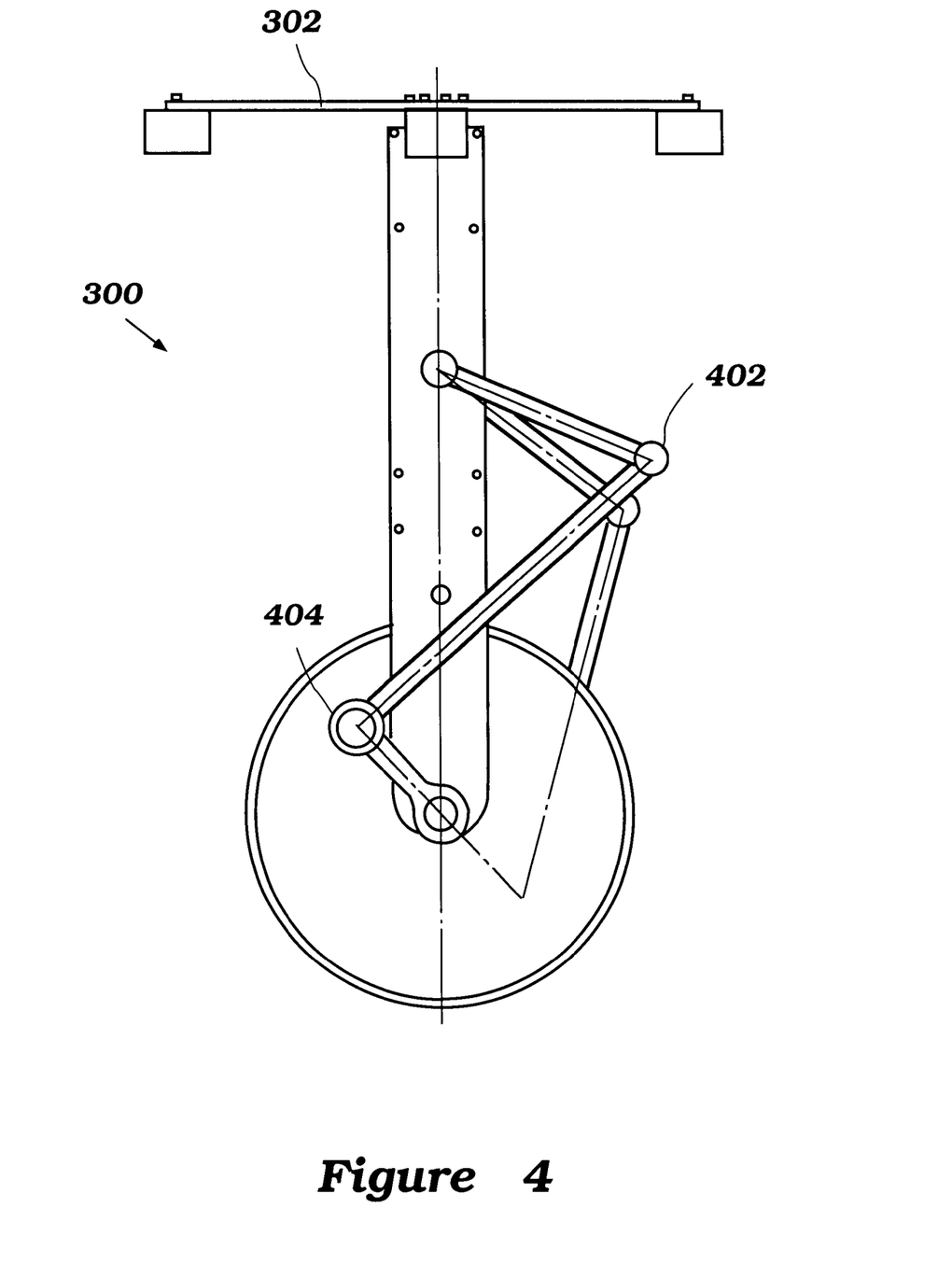
FIG. 4 is a side view showing the robot unicycle shown in FIG. 3.

One embodiment of the self-organizing control system 200 is advantageously used in the simulation of a robot unicycle 300 shown in FIGS. 3 and 4. The unicycle 300 comprises a motor 304 driving a weighted yoke 302. The motor 304 and a rate gyro sensor 306 are attached to a frame 318. A right closing link mechanism 308 is attached between the frame 318 and an axle of a wheel 312. A left closing link mechanism 316 is attached between the frame 318 and the axle of the wheel 312. A motor 310 drives the right link mechanism 308 and a motor 314 drives the left link mechanism 316.

A unicycle is an inherently unstable nonlinear system and simultaneous control of both longitudinal and lateral stability is needed to maintain the unicycle's postural stability. It is an unstable problem in three dimensions. However, a rider can achieve a postural stability on a unicycle, keep the wheel speed constant and change the unicycle's posture in the yaw direction by using a flexible body, good sensory systems, skill and intelligence. Thus, the unicycle is a reasonable testbed for the control system 200.

Analysis of the control system 200 is based on a thermodynamic model representation of the dynamic equation of motion for the plant, described as an open dynamic system. Accordingly, a mechanical model with dissipative processes for the plant in 210 for a unicycle is given by the equation:

$$\begin{bmatrix} \ddot{q} \\ \lambda \end{bmatrix} = \begin{bmatrix} M(q) & -\frac{\partial c}{\partial q} \\ E(q) & 0 \end{bmatrix}^{-1} \tag{23}$$

$$[\tau - B(q)[\dot{q}, \dot{q}] - C(q)[\dot{q}^2] - D(q)[\dot{q}] - G(q) - F(q, \dot{q})]$$

A thermodynamic description of the production of entropy in the control system 200 used in a unicycle can be expressed as:

$$\begin{bmatrix} \frac{dS_u}{dt} \\ \frac{dSc}{dt} \end{bmatrix} = \begin{bmatrix} M(q) & 0 \\ 1 & 0 \end{bmatrix}^{-1} \quad (24)$$

$$[\tau_d - B(q)[\dot{q}, \dot{q}] - C(q)[\dot{q}^2] - D(q)[\dot{q}] - G(q) - f(q, \dot{q})] \begin{bmatrix} \dot{q} \\ 0 \end{bmatrix}$$

where $\tau=(\tau_{105},0,0,0,0,\tau_{\theta2},0,\tau_{\theta4},\tau_n)$ and $dS_c/dt$ is the rate of entropy production in the PID controller 206 and $dSu/dt$ is the rate of entropy production of the plant 210 (the unicycle). E(q) is a 4×4 coefficient matrix for acceleration. F(q,q̇) is a 4 dimensional vector containing coriolis and centrifugal terms. Both E and F are determined from the constraint equations on a closed-link loop acceleration. The matrix $\partial c/\partial q$ is a 4×4 matrix determined by constraint equations of the two closed link loops. The quantity $\lambda$ is a 4-dimensional vector of Lagrangian multipliers; M(q) is a 9×9 matrix of masses; B(q) is a 9×36 matrix of coriolis coefficients; $[\dot{q},\dot{q}]$ is a 36×1 vector of velocity products given by $(\dot{q}, \dot{q})=[\dot{\Psi}\dot{\alpha}, \dot{\Psi}\dot{\gamma}, \ldots \dot{\theta}_4\dot{\eta}]^T$; C(q) is a 9×9 matrix of centrifugal coefficients; $[\dot{q}^2]$ is a 9×1 vector given by $(\dot{\Psi}^2,\dot{\alpha}^2, \dot{\gamma}^2, \dot{\beta}^2,\dot{\theta}_1^2,\dot{\theta}_2^2,\dot{\theta}_3^2,\dot{\theta}_4^2, \dot{\eta}^2)^T$; D(q) is a 9×9 matrix of friction coefficients; $[\dot{q}]=(\dot{\Psi},\dot{\alpha},\dot{\gamma}, \dot{\beta},\dot{\theta}_1,\dot{\theta}_2,\dot{\theta}_3,\dot{\theta}_4, \dot{\eta})^T$; and G(q) is a 9×1 vector of gravity terms. The state vector q is defined as the vector $[q]=(\Psi,\alpha,\gamma,\beta,\theta_1,\theta_2, \theta_3,\theta_4,\eta)^T$. The vector $\tau_d$ describes the dissipative parts of the control torque on the unicycle plant.

Stability analysis of the unicycle as a nonlinear plant 210 is accomplished, as before, by using asymptotic methods with Lyapunov functions and methods of qualitative physics based on correlation between Lyapunov and production entropy functions. The new approach for definition of the Lyapunov function described above is used. A Lyapunov function for the system is given by:

$$V = \frac{1}{2}\left(\sum_{i=1}^{n} q_i^2 + S^2\right) \quad (25)$$

where $S=S_u-S_c$ and $q_i$ is a generalized coordinate of the plant model.

The input u* is a random signal produced by the sum of the control signal u and the disturbance (noise) m(t). Calculation of entropy production performed in the entropy calculator 214. The output of the entropy calculator is the full entropy production of the dynamic system, dS/dt, and the minimum of this function is used as a fitness function in the genetic algorithm 216. The output of the genetic algorithm 216 is an optimal gain structure $K_T$ for the PID controller 206. The structure $K_T$ is used as the teaching signal for the fuzzy neural network 218 in the FLCS 219.

The FLCS 219 comprises the fuzzy neural network 218 and the fuzzy controller 220. The fuzzy neural network 218 generates a Knowledge Base (KB) comprising a look-up table of production rules by using a neural network learning process. The KB output of the fuzzy neural network 218 comprises a Look-up table of Fuzzy Rules (LPTR) as input for the fuzzy controller 220. The KB provides for self-organization of the fuzzy controller 220 in the FLCS 219. The FLCS 219 provides the adaptation process of an intelligent fuzzy controller 220 structure to the random disturbance m(t) in the control signal u*(t). The Output Coefficient Gain Schedule (CGS) of the fuzzy controller is provided as an input to the PID-controller to program the coefficient gains $k_i$ in accordance. This approach differs from procedural design of fuzzy hybrid PID-type controllers. This design method provides new concepts of a robust structure controller 210 with optimal learning, with minimum entropy production in the control process, and self-organization of the KB structure of the fuzzy controller 220.

The genetic algorithm 216 is preferably a massy genetic algorithm with elite strategy. Genetic operators have the following parameters. For the selection, a roulette method (reduce rate=5) is used. A reproduction operator replaces some chromosome generations. Crossover (with a probability of 0.64) and mutation (with a probability of 0.08) determines, by random numbers, every chromosome's bit (i.e., whether crossover and/or mutation occur). Genes encode each parameter from the interval [0,10000] and the number of used chromosomes is 100.

The fuzzy neural network 218 is preferably a feedforward structure network with four layers. The structure of the fuzzy neural network 218 is preferably similar to the structure of the fuzzy controller 220. The first layer in the fuzzy neural network 218 is comparable to fuzzification in the fuzzy controller 220. The second layer in the fuzzy neural network 218 is comparable to an "If . . . " part in the inference mechanism of the fuzzy controller 220. The third layer in the fuzzy neural network is comparable to a "Then . . . " part in the inference mechanism of the fuzzy controller 220. Finally, the fourth layer in the fuzzy neural network is comparable to a de-fuzzification operator structure in the fuzzy controller 220. The structure of the fuzzy neural network 218 may use a max-min method for the fuzzy inference and the fuzzy production rules. The membership functions of the fuzzy neural network 218 are preferably optimized by the back-propagation method with minimum information entropy as the criteria of accuracy. In one embodiment used with a unicycle simulation, the fuzzy neural network 218 has 2 inputs, 2 hidden layers (14 units in the first layer and 49 units in the second layer), 1 output, 7 linguistic terms for error and change of error, and 49 rules in the Knowledge Base.

One aspect of the simulation is a comparison of results between the genetic algorithm 216 and the fuzzy neural network 218 for the torque and PID controller gains with minimum entropy production.

Figure 5:
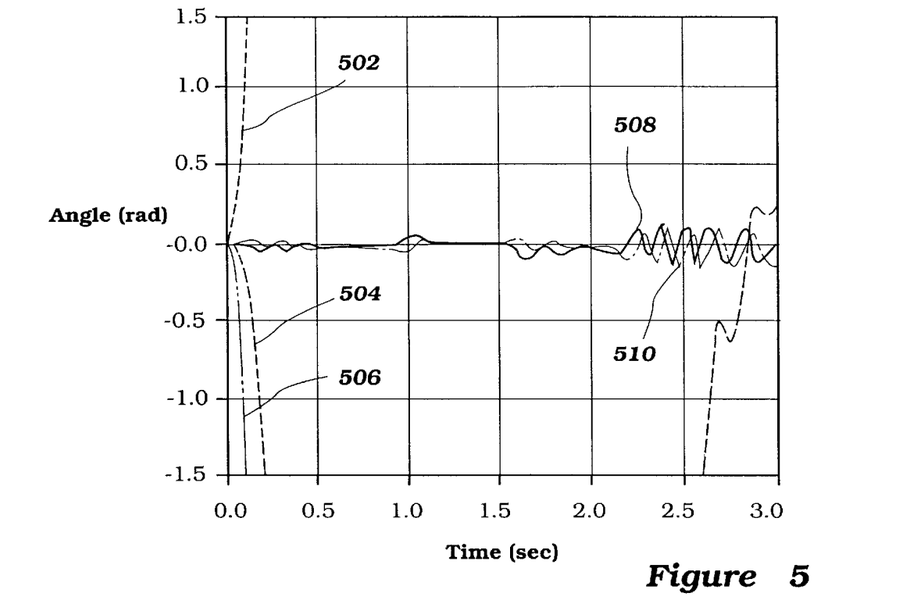
FIG. 5 is a graph showing the time changes in angle for each part of the robot unicycle as a result of a simulation of an AI posture control system for the unicycle.

FIG. 5 is a graph 500 of angle (in radians) as a function of time (in seconds) for a simulated unicycle with an AI controller 200. The graph 500 shows a curve 502 showing the angle of the rotor, a curve 504 showing the angle of the wheel, a curve 506 showing yaw of the unicycle, a curve 508 showing roll of the unicycle, and a curve 510 showing pitch of the unicycle.

Figure 6:
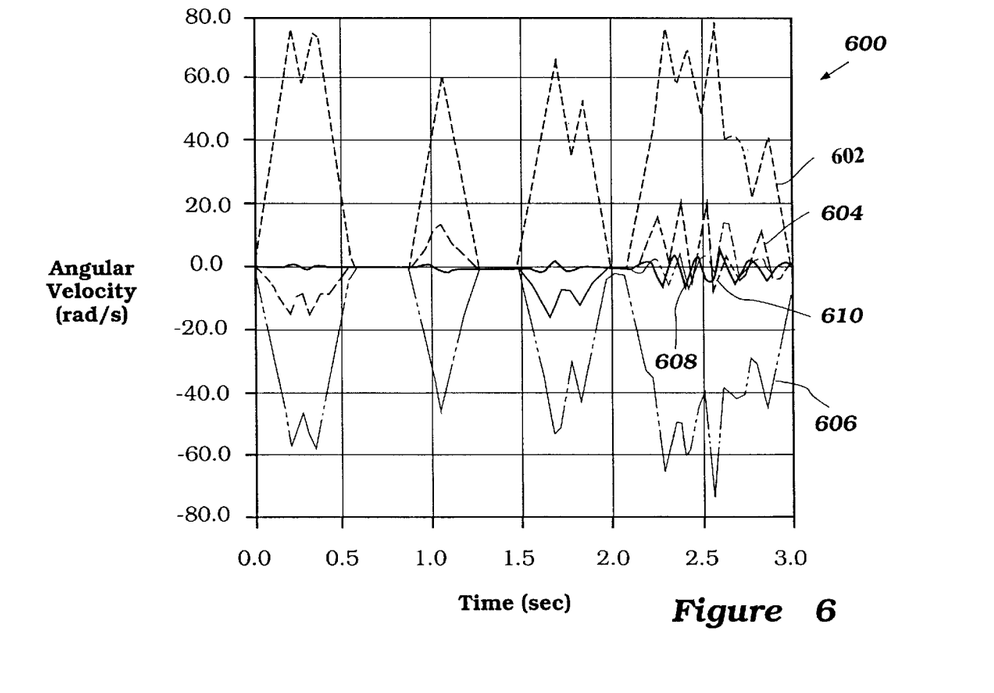
FIG. 6 is a graph showing the time changes in angular velocity for each part of the robot unicycle during the posture control simulation.

FIG. 6 is a graph 600 of angular velocity (in radians/second) as a function of time (in seconds). The graph 600 shows a curve 602 showing the angle of the rotor, a curve 604 showing the angle of the wheel, a curve 606 showing yaw of the unicycle, a curve 608 showing roll of the unicycle, and a curve 610 showing pitch of the unicycle.

Figure 7:
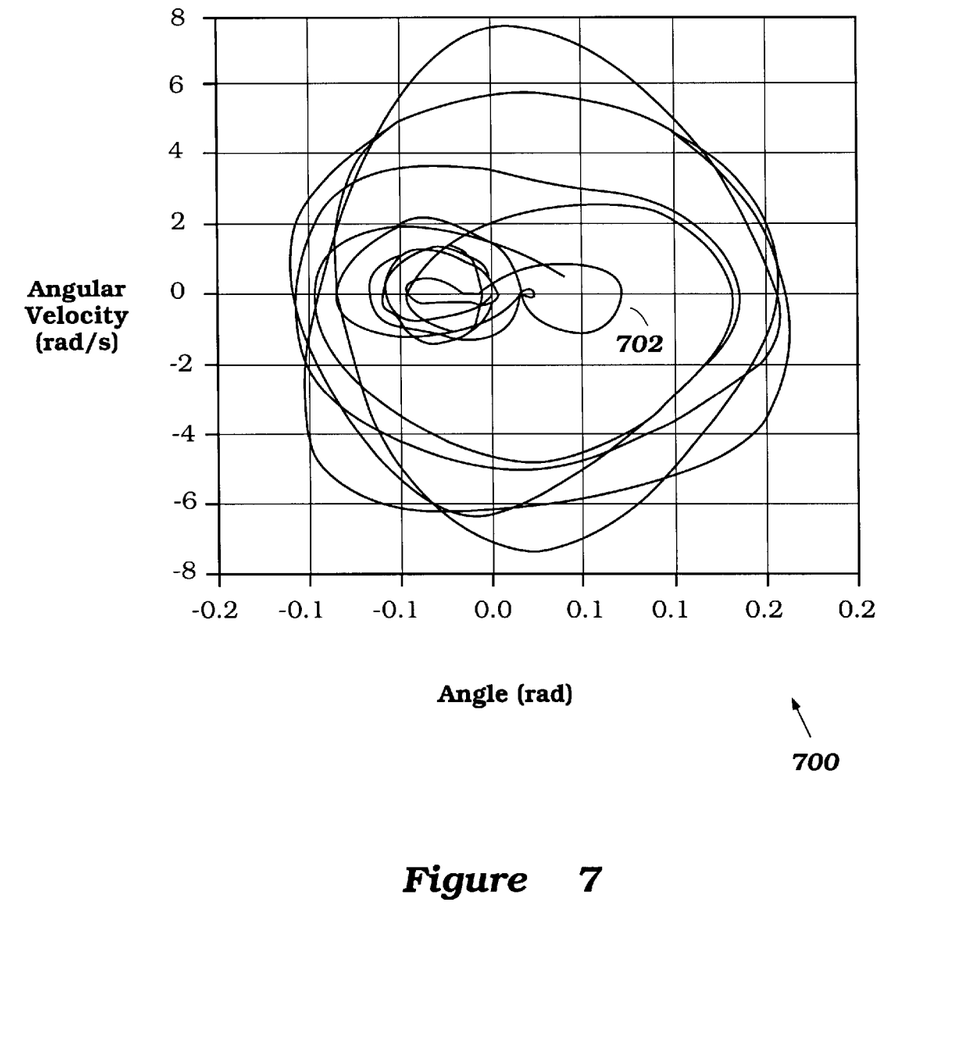
FIG. 7 is a graph showing a phase surface for the roll angle and angular velocity during the posture control simulation.

FIG. 7 is a graph showing a phase surface for the roll angle (in radians) and angular velocity (in radians/second) as a result of the simulation for the posture control performed by the robot unicycle in FIG. 3.

Figure 8:
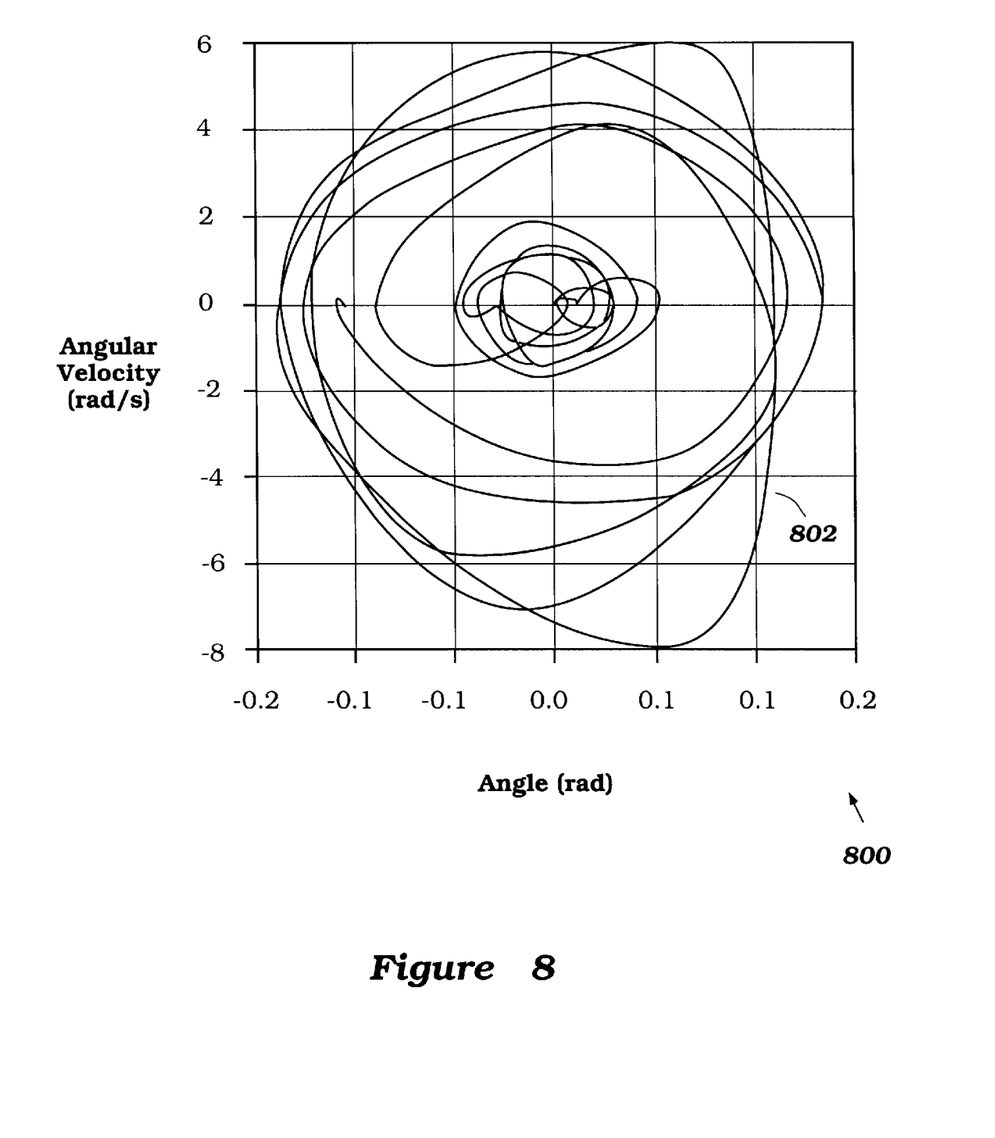
FIG. 8 is a graph showing a phase surface for the pitch angle and angular velocity during the posture control simulation.

FIG. 8 is a graph showing a phase surface for the pitch angle (in radians) and angle speed (in radians/second) as a result of the simulation for the posture control performed by the robot unicycle in FIG. 3.

Figure 9:
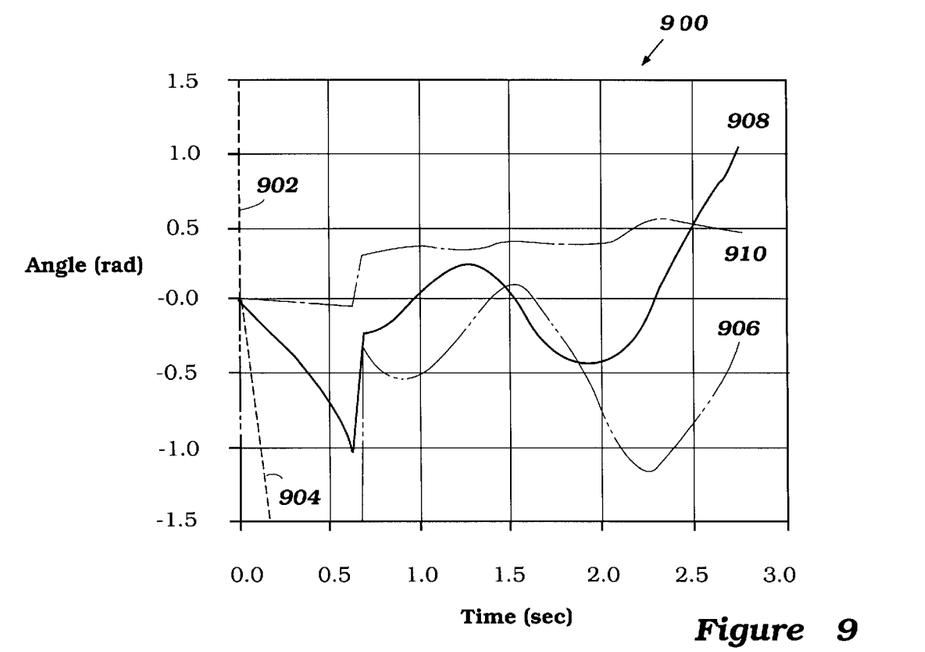
FIG. 9 is a graph showing the time changes in angle for each part of the robot unicycle during a posture control simulation using an AI system of the prior art.

FIG. 9 is a graph 900 showing the time changes in angle (in radians) as a function of time (in seconds) for each part in the unicycle as a result of the simulation for the posture control using the methods in the prior art. The graph 900 includes a curve 902 showing the angle of the rotor, a curve 904 showing the angle of the wheel, a curve 906 showing yaw of the unicycle, a curve 908 showing roll of the unicycle, and a curve 910 showing pitch of the unicycle.

Figure 10:
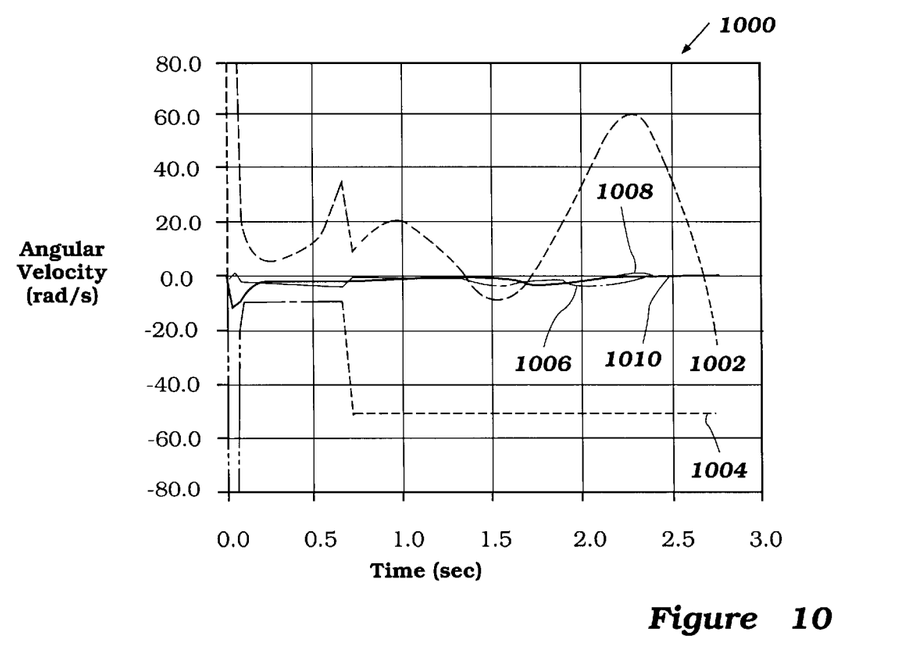
FIG. 10 is a graph showing the time changes in angular velocity during the prior art posture control simulation.

FIG. 10 is a graph showing the time changes in angular velocity (in radians/second) versus time (in seconds) for each part of the unicycle as a result of the simulation for the posture control in the prior art. The graph 1000 includes a curve 1002 showing the angle of the rotor, a curve 1004 showing the angle of the wheel, a curve 1006 showing yaw of the unicycle, a curve 1008 showing roll of the unicycle, and a curve 1010 showing pitch of the unicycle.

Figure 11:
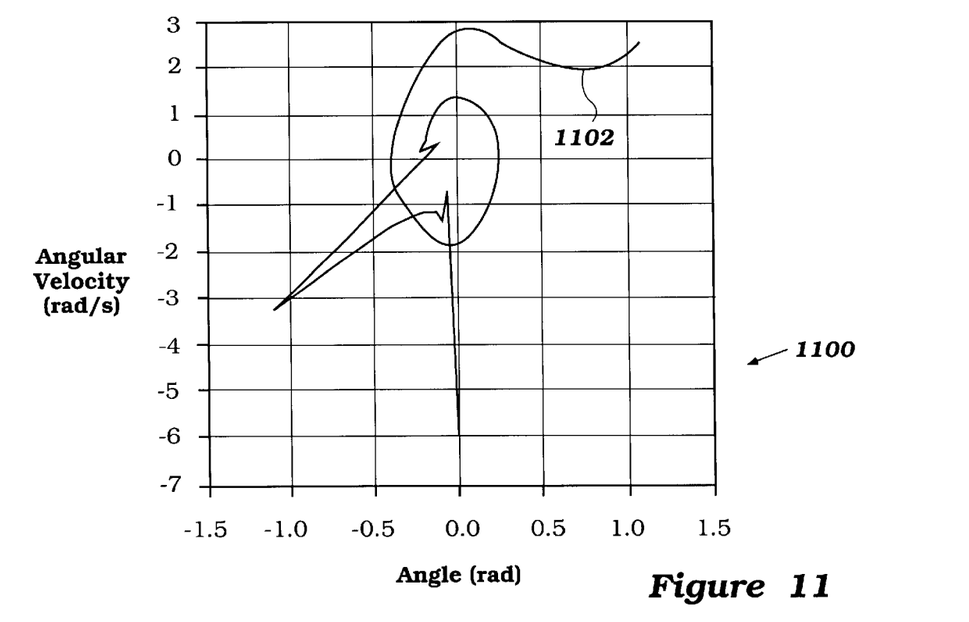
FIG. 11 is a graph showing a phase surface for the roll angle and angular velocity during the prior art posture control simulation.

FIG. 11 is a graph showing a phase surface for the roll angle and angle speed as a result of the simulation for the posture control in the prior art which is performed by the robot unicycle in FIG. 3.

Figure 12:
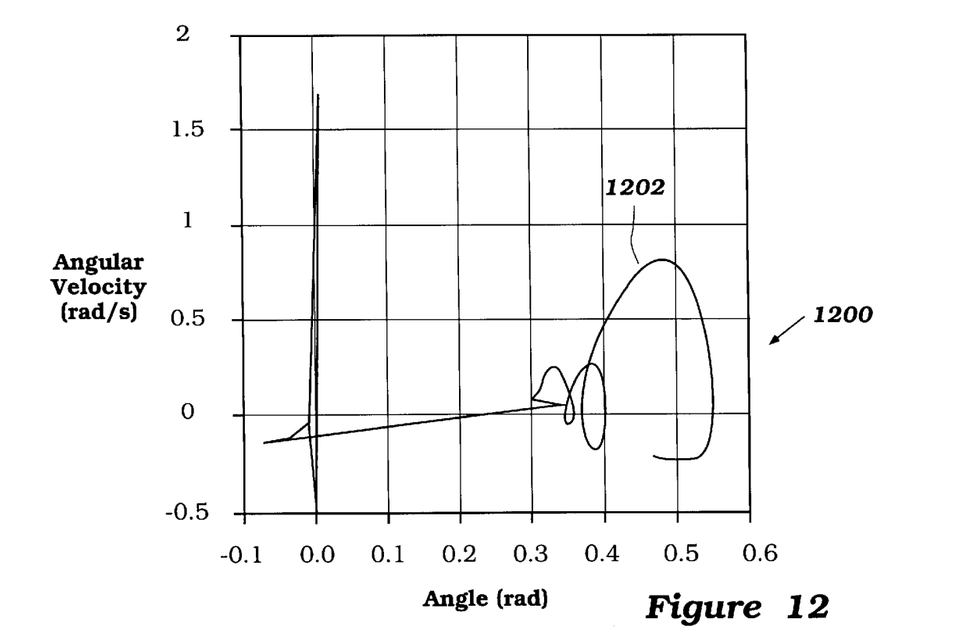
FIG. 12 is a graph showing a phase surface for the pitch angle and angular velocity during the prior art posture control simulation.

FIG. 12 is a graph 1200 illustrating a phase surface for the pitch angle and angle speed as a result of a simulation of the robot unicycle in FIG. 3, using the posture control in the prior art.

Figure 13:
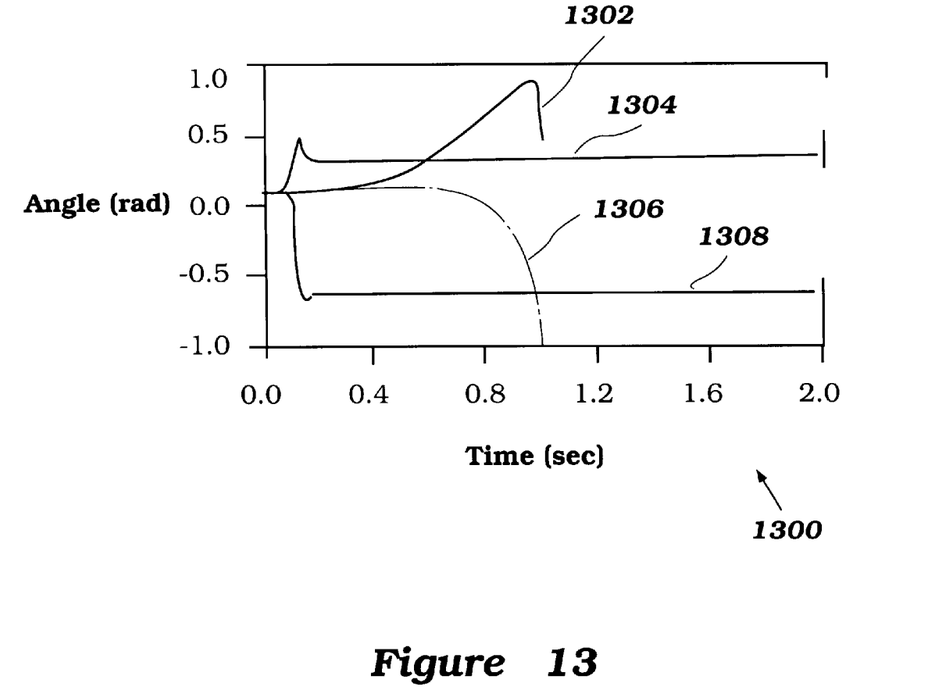
FIG. 13 shows another example of the simulation for the posture control indicating the effect of the control method in the present invention.

FIG. 13 is a graph 1300 illustrating another example of the simulation for the posture control indicating the effect of the control method in the present invention. The graph 1300 is a plot of angle (in radians) versus time (in seconds). The graph 1300 includes a curve 1302 showing roll without control, a curve 1304 showing roll with control, a curve 1306 showing pitch without control, and a curve 1308 showing pitch with control.

Although the foregoing has been a description and illustration of specific embodiments of the invention, various modifications and changes can be made thereto by persons skilled in the art, without departing from the scope and spirit of the invention as defined by the following claims.

What is claimed is:

1. A self-organizing method for controlling a nonlinear plant, comprising the steps of: obtaining a difference between a time differentiation ($dS_u/dt$) of the entropy of a plant and a time differentiation ($dS_c/dt$) of the entropy provided to the plant from a low-level controller that controls the plant; evolving a control rule by using an evolution in a genetic algorithm, said genetic algorithm using said difference as a performance function to minimize said difference; and using said control rule of a fuzzy controller to develop a gain schedule for said low-level controller.

2. The method of claim 1, further comprising the steps of: analyzing one or more nonlinear operation characteristics of said physical plant by using a Lyapunov function; and correcting said control rule based on an evolution.

3. The method of claim 1, further comprising the steps of: evolving a control rule relative to a variable of said low-level controller by means of a genetic algorithm, said genetic algorithm using fitness function that reduces a difference between a time differentiation of an entropy of said plant ($dS_u/dt$) and a time differentiation ($dS_c/dt$) of an entropy provided to said plant from said low-level controller; and correcting a variable of said low-level controller based on said evolved control rule.

4. A control apparatus adapted to control a nonlinear plant, comprising: a simulator configured to use a thermodynamic model of an equation of motion for a nonlinear plant, said thermodynamic model based on a Lyapunov function (V), said simulator further configured to analyze control for a state stability of said plant, calculate an entropy production amount based on a difference between a time differentiation of entropy of said plant ($dS_u/dt$) and a time differentiation ($dS_c/dt$) of an entropy provided to said plant from a low-level controller that controls said plant, and using a genetic algorithm to obtain an adaptation function in which said difference is minimized, said genetic algorithm using a fitness function configured to minimize said difference; and a fuzzy logic classifier configured to determine a fuzzy rule by using a learning process, said fuzzy logic classifier configured to use an output from said simulation part as a teaching signal, said fuzzy logic controller further configured to form a control rule that sets a variable gain of said controller by following said fuzzy rule.

5. The apparatus of claim 4, wherein said simulator further comprises: an entropy calculator configured to compute a difference between a time differentiation of an entropy $S_u$ of said plant and time differentiation of an entropy $S_c$ of a control signal provided to said plant from said low-level controller based on information obtained from said plant; and a genetic algorithm calculator configured to evolve said teaching signal by using said difference as a performance function.

6. The apparatus of claim 4, wherein said fuzzy logic classifier comprises: a fuzzy neural network configured to form a look-up table for said fuzzy rule by using said learning process; and a fuzzy controller configured to generating a variable gain schedule for said controller that controls said plant.

7. The apparatus of claim 4, wherein said low-level controller is a linear controller.

8. The apparatus of claim 4, wherein said low-level controller is a PID controller.

9. An apparatus comprising: a plant; a low-level controller that controls said plant; means for calculating a difference between a time differentiation of the entropy of said plant and a time differentiation of the entropy provided by said low-level controller; means for calculating a control rule by an evolution in a genetic algorithm, said genetic algorithm using a fitness function that reduces said difference; and a fuzzy logic classifier configured to use said control rule to compute a gain schedule for said low-level controller.

10. The apparatus of claim 9, wherein said fuzzy logic classifier comprises a fuzzy neural network.

11. The apparatus of claim 9, wherein said fuzzy logic classifier comprises a fuzzy controller.

12. The apparatus of claim 9, wherein said low-level controller is a PID controller.

13. A method for controlling a plant, the method comprising: obtaining a difference between a time differentiation of the entropy of a plant and a time differentiation of the entropy provided to the plant from a low-level controller that controls the plant; providing said difference to a genetic optimizer, said genetic optimizer configured to evolve a control rule by using a fitness function that causes said genetic optimizer to produce a chromosome corresponding to a control rule of a fuzzy controller that reduces said difference; and using said control rule to configure a gain schedule for said low-level controller.

14. The method of claim 13, wherein said gain schedule is computed by a fuzzy controller, said fuzzy controller configured by a fuzzy neural network.

15. The method of claim 13, wherein said plant is a nonlinear plant.

16. The method of claim 15, wherein said plant is a nonlinear plant and a simulator is configured to use a thermodynamic model of an equation of motion for said plant, said thermodynamic model based on a Lyapunov function to calculate said time differentiation of the entropy of said plant and said time differentiation of the entropy provided to said plant.

* * * * *